(12) United States Patent
Wang et al.

(10) Patent No.: US 11,086,016 B2
(45) Date of Patent: Aug. 10, 2021

(54) METHOD AND APPARATUS FOR TRACKING OBSTACLE

(71) Applicant: Baidu Online Network Technology (Beijing) Co., Ltd., Beijing (CN)

(72) Inventors: Jun Wang, Beijing (CN); Ye Zhang, Beijing (CN); Yujiang Hui, Beijing (CN); Liang Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 240 days.

(21) Appl. No.: 16/048,974

(22) Filed: Jul. 30, 2018

(65) Prior Publication Data
US 2019/0086543 A1   Mar. 21, 2019

(30) Foreign Application Priority Data

Sep. 15, 2017  (CN) .......................... 201710835119.4

(51) Int. Cl.
*G01S 17/66*     (2006.01)
*G01S 7/48*      (2006.01)
*G01S 7/481*     (2006.01)
*G01S 17/42*     (2006.01)
(Continued)

(52) U.S. Cl.
CPC ............ *G01S 17/66* (2013.01); *G01S 7/4802* (2013.01); *G01S 7/4817* (2013.01); *G01S 17/42* (2013.01); *G01S 17/58* (2013.01); *G01S 17/931* (2020.01)

(58) Field of Classification Search
CPC .......... G01S 17/66; G01S 17/42; G01S 17/58; G01S 17/931; G01S 7/4817; G01S 7/4802; G01T 2207/30252; G01T 2207/10028; G01T 2207/10021; G01T 7/246;
(Continued)

(56) References Cited

U.S. PATENT DOCUMENTS

2007/0193798 A1* 8/2007 Allard .................. G05D 1/0061
                                                     180/169
2007/0211917 A1  9/2007 Nakano et al.
2016/0321820 A1  11/2016 Ely

FOREIGN PATENT DOCUMENTS

CN    103262121 A    8/2013
CN    106033613 A    10/2016

OTHER PUBLICATIONS

Zhang et al., A Real-Time Curb Detection and Tracking Method for UGVs by Using a 3D-LIDAR Sensor, Sep. 21-23, 2015, 2015 IEEE Conference on Control Applications (CCA), Part of 2015 IEEE Multi-Conference on Systems and Control, Sydney, Australia, pp. 1020-1025 (Year: 2015).*

* cited by examiner

*Primary Examiner* — Toan M Le
(74) *Attorney, Agent, or Firm* — von Briesen & Roper, s.c.

(57) ABSTRACT

The disclosure discloses a method and apparatus for tracking an obstacle. A specific embodiment of the method comprises: acquiring, in response to detecting multiple obstacle laser point clouds in a current laser point cloud frame, multiple historical obstacle laser point cloud sequences; calculating a respective association degree between each detected obstacle laser point cloud in the current laser point cloud frame and each historical obstacle laser point cloud sequence based on association information to obtain multiple association degrees; and searching for a historical
(Continued)

obstacle laser point cloud sequence to which each detected obstacle laser point cloud in the current laser point cloud frame belongs based on the multiple association degrees.

11 Claims, 3 Drawing Sheets

(51) Int. Cl.
*G01S 17/58* (2006.01)
*G01S 17/931* (2020.01)

(58) Field of Classification Search
CPC ........... G06T 7/246; G06T 2207/30252; G06T 2207/10028; G06T 2207/10021
See application file for complete search history.

METHOD AND APPARATUS FOR TRACKING OBSTACLE

CROSS-REFERENCE TO RELATED APPLICATIONS

This application claims the priority of Chinese Application No. 201710835119.4, filed on Sep. 15, 2017, titled "Method and Apparatus for Tacking Obstacle," the entire disclosure of which is incorporated herein by reference.

TECHNICAL FIELD

The disclosure relates to the field of vehicle, specifically to the field of autonomous driving technology, and more specifically to a method and apparatus for tracking an obstacle.

BACKGROUND

The autonomous driving vehicle makes its driving decision on the basis of sensing the driving environment. Tracking an obstacle is the most pivotal process while sensing the driving environment. At present, a commonly used method for tracking an obstacle is: tracking the obstacle based on the neighbouring relationship between laser point locations of the obstacle in a multi-frame laser point cloud.

The obstacle is tracked only based on the neighboring relationship of a single location without considering the influence of other factors, such as the laser point cloud of the obstacle changing over a view angle, and the obstacle laser point detection error, during the obstacle tracking process, thereby leading to a low accuracy in the obstacle tracking.

SUMMARY

The disclosure provides a method and apparatus for tracking an obstacle, to solve the technical problems existing in the background part.

In a first aspect, the disclosure provides a method for tracking an obstacle, the method including: acquiring, in response to detecting multiple obstacle laser point clouds in a current laser point cloud frame, multiple historical obstacle laser point cloud sequences, each historical obstacle laser point cloud in a same historical obstacle laser point cloud sequence representing a same obstacle, each historical obstacle laser point cloud in the historical obstacle laser point cloud sequences being an obstacle laser point cloud in a historical laser point cloud frame collected prior to collecting the current laser point cloud frame; calculating a respective association degree between each detected obstacle laser point cloud in the current laser point cloud frame and each historical obstacle laser point cloud sequence based on association information to obtain multiple association degrees, the association information including: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence; and searching for a historical obstacle laser point cloud sequence to which each detected obstacle laser point cloud in the current laser point cloud frame belongs based on the multiple association degrees.

In a second aspect, the disclosure provides an apparatus for tracking an obstacle, the apparatus including: a detection unit, configured for acquiring, in response to detecting multiple obstacle laser point clouds in a current laser point cloud frame, multiple historical obstacle laser point cloud sequences, each historical obstacle laser point cloud in a same historical obstacle laser point cloud sequence representing a same obstacle, each historical obstacle laser point cloud in the historical obstacle laser point cloud sequences being an obstacle laser point cloud in a historical laser point cloud frame collected prior to collecting the current laser point cloud frame; a calculation unit, configured for calculating a respective association degree between each detected obstacle laser point cloud in the current laser point cloud frame and each historical obstacle laser point cloud sequence based on association information to obtain multiple association degrees, the association information including: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence; and a matching unit, configured for searching for a historical obstacle laser point cloud sequence to which each detected obstacle laser point cloud in the current laser point cloud frame belongs based on the multiple association degrees.

With the method and apparatus for tracking an obstacle according to the disclosure, in response to detecting multiple obstacle laser point clouds in a current laser point cloud frame, multiple historical obstacle laser point cloud sequences are acquired, each historical obstacle laser point cloud in a same historical obstacle laser point cloud sequence representing a same obstacle, each historical obstacle laser point cloud in the historical obstacle laser point cloud sequences being an obstacle laser point cloud in a historical laser point cloud frame collected prior to collecting the current laser point cloud frame; a respective association degree between each detected obstacle laser point cloud in the current laser point cloud frame and each historical obstacle laser point cloud sequence is calculated based on association information to obtain multiple association degrees, the association information including: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence; and a historical obstacle laser point cloud sequence to which each detected obstacle laser point cloud in the current laser point cloud frame belong is search for based on the multiple association degrees. An obstacle is tracked in real time considering the association of the appearance characteristic and the motion characteristic of the obstacle with the process of tracking the obstacle, thereby improving the tracking accuracy.

BRIEF DESCRIPTION OF THE DRAWINGS

By reading and referring to detailed description on the non-limiting embodiments in the following accompanying drawings, other features, objects and advantages of the disclosure may become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
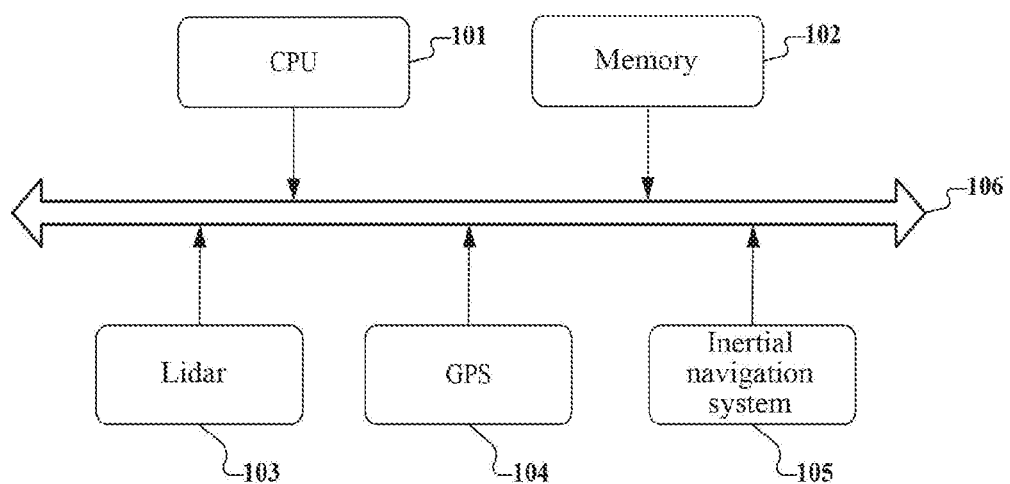
FIG. 1 shows a schematic diagram of a structure of hardware suitable for an autonomous vehicle according to the disclosure.

Referring to FIG. 1, FIG. 1 shows a schematic diagram of a structure of hardware suitable for an autonomous vehicle according to the disclosure.

As shown in FIG. 1, the autonomous vehicle includes a CPU 101, a memory 102, a lidar 103, a GPS 104 and an inertial navigation system 105. The CPU 101, the memory 102, the lidar 103, the GPS 104 and the inertial navigation system 105 are connected to each other through a bus 106.

When the autonomous vehicle is running, the lidar therein may collect one frame of laser point cloud in each revolution. The laser emitted by the lidar in one revolution is projected onto all obstacles around the autonomous vehicle, thereby forming laser points, which may form one laser point cloud frame.

Figure 2:
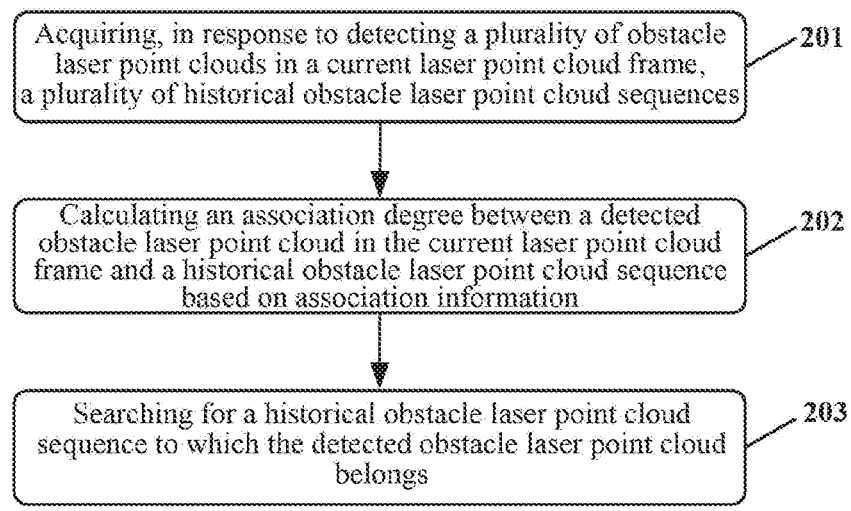
FIG. 2 shows a process diagram of an embodiment of a method for tracking an obstacle according to the disclosure.

Referring to FIG. 2, FIG. 2 shows a process of an embodiment of a method for tracking an obstacle according to the disclosure. The method may be executed by an autonomous vehicle, for example, an autonomous vehicle having a structure as shown in FIG. 1. The method includes steps 201 to 203.

Step 201 includes: acquiring, in response to detecting multiple obstacle laser point clouds in a current laser point cloud frame, multiple historical obstacle laser point cloud sequences.

In the embodiment, a historical obstacle laser point cloud sequence may include multiple historical obstacle laser point clouds, and historical obstacle laser point clouds in a same historical obstacle laser point cloud sequence correspond to a same obstacle. That is, a historical obstacle laser point cloud sequence includes a series of obstacle laser point clouds which are associated with each other in time sequence and used for represent a same obstacle.

In the embodiment, the current laser point cloud frame does not refer to a specific laser point cloud frame collected by the lidar during one collection period, i.e., during one revolution of the lidar. The current laser point cloud frame is relative to the historical laser point cloud frame collected prior to collecting the current laser point cloud frame. When a next laser point cloud frame after the current laser point cloud frame is collected, the current laser point cloud frame may also become a historical laser point cloud frame relative to the next laser point cloud frame. The order of historical obstacle laser point clouds in the historical obstacle laser point cloud sequence corresponds to the order of collection periods corresponding to historical laser point cloud frames to which the historical laser point clouds belong. The collection periods corresponding to historical laser point cloud frames to which time-adjacent historical obstacle laser point clouds belong are also adjacent. The first historical obstacle laser point cloud in the historical obstacle laser point cloud sequence may belong to a last laser point cloud frame prior to the current laser point cloud frame.

In the embodiment, the current laser point cloud frame may be a latest collected laser point cloud frame, and the historical obstacle laser point cloud in the historical obstacle laser point cloud sequence may be an obstacle laser point cloud in a historical laser point cloud frame collected before collecting the latest collected laser point cloud frame. The first historical obstacle laser point cloud in the historical obstacle laser point cloud sequence may belong to a last laser point cloud frame prior to the latest collected laser point cloud frame.

In the embodiment, first, multiple obstacle laser point clouds in the current laser point cloud frame may be detected when tracking an obstacle. For example, multiple obstacle laser point clouds in the current laser point cloud frame may be detected by segmenting the current laser point cloud frame. Each obstacle laser point cloud detected in the current laser point cloud frame may represent a respective obstacle.

Step 202 includes: calculating an association degree between the detected obstacle laser point cloud in the current laser point cloud frame and the historical obstacle laser point cloud sequence based on association information.

In the embodiment, after detecting multiple obstacle laser point clouds in the current laser point cloud frame, and acquiring multiple historical obstacle laser point cloud sequences, an association degree between each detected obstacle laser point cloud in the current laser point cloud frame and each historical obstacle laser point cloud sequence may be calculated based on the association information.

In the embodiment, the association information may include, but is not limited to: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence.

In the embodiment, the similarity degree between the appearance characteristic of the detected obstacle laser point cloud in the current laser point cloud frame and the appearance characteristic of the historical obstacle laser point cloud in the historical obstacle laser point cloud sequence may be used for representing appearance consistency between the detected obstacle laser point cloud in the current laser point cloud frame and the historical obstacle laser point cloud in the historical obstacle laser point cloud sequence. The consistency between the current motion characteristic of the obstacle represented by the detected obstacle laser point cloud in the current laser point cloud frame and the historical motion characteristic of an obstacle represented by the historical obstacle laser point cloud in the historical obstacle laser point cloud sequence may be used for representing motion consistency between the detected obstacle laser point cloud in the current laser point cloud frame and the historical obstacle laser point cloud in the historical obstacle laser point cloud sequence.

In the embodiment, the association degree between the detected obstacle laser point cloud in the current laser point cloud frame and the historical obstacle laser point cloud sequence is calculated, and the appearance consistency and the motion consistency are considered in the calculation.

Taking calculating an association degree between one detected obstacle laser point cloud in the current laser point cloud frame and one historical obstacle laser point cloud sequence as an example, a similarity degree between an appearance characteristic of the one detected obstacle laser point cloud in the current laser point cloud frame and an appearance characteristic of the historical obstacle laser point cloud in the one historical obstacle laser point cloud sequence, and a parameter capable of representing consistency between a current motion characteristic of an obstacle represented by the one detected obstacle laser point cloud in the current laser point cloud frame and a historical motion characteristic of an obstacle represented by the historical obstacle laser point clouds in the one historical obstacle laser point cloud sequence may be calculated respectively. Then, the calculated similarity degree and the parameter representing consistency may be weighted and calculated to obtain the association degree between the one detected obstacle laser point cloud in the current laser point cloud frame and the one historical obstacle laser point cloud sequence.

In the embodiment, when calculating a similarity degree between an appearance characteristic of one detected obstacle laser point cloud in the current laser point cloud frame and one obstacle laser point cloud in the historical obstacle laser point cloud sequence, a respective appearance similarity degree may be calculated for each appearance characteristic involved in the similarity degree calculation, and then multiple appearance similarity degrees may be weighted and calculated to obtain the similarity degree between the appearance characteristic of the one detected obstacle laser point cloud in the current laser point cloud frame and the appearance characteristic of the one obstacle laser point cloud in the historical obstacle laser point cloud sequence.

In the embodiment, when calculating the similarity degree between the appearance characteristic of the one detected obstacle laser point cloud in the current laser point cloud frame and the appearance characteristic of the historical obstacle laser point cloud in the one historical obstacle laser point cloud sequence, only the appearance characteristic of the one detected obstacle laser point cloud in the current laser point cloud frame and an appearance characteristic of one obstacle laser point cloud in the one historical obstacle laser point cloud sequence may be calculated. For example, only a similarity degree between the appearance characteristic of the one detected obstacle laser point cloud in the current laser point cloud frame and the appearance characteristic of the obstacle laser point cloud of the historical obstacle laser point cloud sequence in a last laser point cloud frame prior to the current laser point cloud frame is calculated, and this similarity degree is used as the similarity degree between the appearance characteristic of the one detected obstacle laser point cloud in the current laser point cloud frame and the appearance characteristic of the historical obstacle laser point cloud in the one historical obstacle laser point cloud sequence. Alternatively, similarity degrees between the appearance characteristic of the one detected obstacle laser point cloud in the current laser point cloud frame and appearance characteristics of multiple historical obstacle laser point clouds in the one historical obstacle laser point cloud sequence may be calculated, and then an average value or a median of the calculated similarity degrees may be used as the similarity degree between the appearance characteristic of the one detected obstacle laser point cloud in the current laser point cloud frame and the appearance characteristics of the historical obstacle laser point clouds in the one historical obstacle laser point cloud sequence.

In the embodiment, the current motion characteristic may be a motion characteristic of an obstacle represented by an obstacle laser point cloud detected at a moment of collecting the current laser point cloud frame, for example, a speed and a posture of the obstacle represented by the obstacle laser point cloud detected at the moment of collecting the current laser point cloud frame. The historical motion characteristic may be a historical motion characteristic of an obstacle represented by a historical obstacle laser point cloud at a moment of collecting the historical laser point cloud frame to which the historical obstacle laser point cloud in the historical obstacle laser point cloud sequence belongs, for example, a historical speed and a historical posture of the obstacle represented by the historical obstacle laser point cloud at the moment of collecting the historical laser point cloud frame to which the historical obstacle laser point cloud in the historical obstacle laser point cloud sequence belongs.

The consistency between the current motion characteristic of the obstacle represented by the detected obstacle laser point cloud in the current laser point cloud frame and the historical motion characteristic of the obstacle represented by the historical obstacle laser point cloud in the historical obstacle laser point cloud sequence may be represented by a parameter representing consistency between the current motion characteristic of the obstacle represented by the detected obstacle laser point cloud in the current laser point cloud frame and the historical motion characteristic of the obstacle represented by multiple historical obstacle laser point clouds in the historical obstacle laser point cloud sequence.

For example, taking the speed in the motion characteristics as an example, the speed is a vector including a speed magnitude and a speed direction. The speed of the obstacle represented by the obstacle laser point cloud in the current laser point cloud frame detected at the moment that the current laser point cloud frame is collected may be represented by a dot in a two-dimensional coordinate system including coordinate axes corresponding to the speed magnitude and direction. Historical speeds of the obstacle represented by the historical obstacle laser point cloud at moments that the historical laser point cloud frames of historical obstacle laser point clouds in the historical obstacle laser point cloud sequence are respectively collected each may also be represented by one dot, and then all of the dots may be fitted to obtain a current fitting result. Then, a deviation value between the current fitting result and a historical fitting result obtained by only fitting the dots representing the historical speeds of the obstacle represented by the historical obstacle laser point cloud may be calculated. The deviation value may be a deviation angle between a slope of a fitting line corresponding to the current fitting result and a slope of a fitting line corresponding to the historical fitting result. The deviation value may be used as a parameter representing consistency between motion characteristics, to measure the consistency between the motion characteristics.

In the embodiment, after calculating the association degree between each detected obstacle laser point cloud in the current laser point cloud frame and each historical obstacle laser point cloud sequence, multiple association degrees may be obtained.

For example, when the number of detected obstacle laser point clouds in the current laser point cloud frame is M, and the number of acquired historical obstacle laser point cloud sequences is N, then M*N association degrees can be calculated.

In some optional implementations of the embodiment, the appearance characteristic includes: a size, the number of the laser point, a laser point density and a geometrical shape. A size of the obstacle laser point cloud may be a size of a bounding box of the obstacle laser point cloud.

The similarity degree between a size of the detected obstacle laser point cloud in the current laser point cloud frame and a size of the historical obstacle laser point cloud in the historical obstacle laser point cloud sequence may be used for representing consistency between the size of the detected obstacle laser point cloud in the current laser point cloud frame and the size of the historical obstacle laser point cloud in the historical obstacle laser point cloud sequence. The similarity degree between the number of the laser point of the detected obstacle laser point cloud in the current laser point cloud frame and the number of the laser point of the historical obstacle laser point cloud in the historical obstacle laser point cloud sequence may be used for representing consistency between the number of the laser point of the detected obstacle laser point cloud in the current laser point cloud frame and the number of the laser point of the historical obstacle laser point cloud in the historical obstacle laser point cloud sequence. The similarity degree between a geometrical shape of the detected obstacle laser point cloud in the current laser point cloud frame and a geometrical shape of the historical obstacle laser point cloud in the historical obstacle laser point cloud sequence may be used for representing consistency between the geometrical shape of the detected obstacle laser point cloud in the current laser point cloud frame and the geometrical shape of the historical obstacle laser point cloud in the historical obstacle laser point cloud sequence.

When calculating the similarity degree between an appearance characteristic of one detected obstacle laser point cloud in the current laser point cloud frame and an appearance characteristic of one obstacle laser point cloud in the historical obstacle laser point cloud sequence, an appearance similarity degree may be calculated for each of appearance characteristics, such as size, the number of the laser point, laser point density or geometrical shape, and then multiple appearance similarity degrees are weighted and calculated to obtain the similarity degree between the appearance characteristic of the one detected obstacle laser point cloud in the current laser point cloud frame and the appearance characteristic of the one obstacle laser point cloud in the historical obstacle laser point cloud sequence.

When calculating a similarity degree between a size of one detected obstacle laser point cloud in the current laser point cloud frame and a size of one historical obstacle laser point cloud in the historical obstacle laser point cloud sequence, first, a length, a width and a height of a bounding box of the one detected obstacle laser point cloud in the current laser point cloud frame, and a length, a width and a height of a bounding box of the one historical obstacle laser point cloud in the historical obstacle laser point cloud sequence may be determined respectively based on postures of the bounding box of the one detected obstacle laser point cloud in the current laser point cloud frame and the bounding box of the one historical obstacle laser point cloud in the historical obstacle laser point cloud sequence i.e., deflection angles of the bounding box in the X axis, the Y axis and the Z axis. Then, a difference value of the lengths, a difference value of the widths, and a difference value of the heights may be calculated. For example, a difference value of the lengths may be represented by (length 1−length 2)/max (length 1, length 2). The length 1 may represent the length of the bounding box of the one detected obstacle laser point cloud in the current laser point cloud frame or the length of the bounding box of the one historical obstacle laser point cloud in the historical obstacle laser point cloud sequence, and the length 2 may represent the length of another bounding box. The difference value of the lengths, the difference value of the widths, and the difference value of the heights may be calculated respectively, and a maximum value, a minimum value and an average value of all difference values may be selected for calculating the similarity degree between the size of the one detected obstacle laser point cloud in the current laser point cloud frame and the size of the one historical obstacle laser point cloud in the historical obstacle laser point cloud sequence.

When calculating a similarity degree between the number of a laser point of one detected obstacle laser point cloud in the current laser point cloud frame and the number of a laser point of one historical obstacle laser point cloud in the historical obstacle laser point cloud sequence, the similarity degree may be represented by (the first number of the laser point—the second number of the laser point)/max(the first number of the laser point, the second number of the laser point). The first number of the laser point may represent the number of the laser point of the one detected obstacle laser point cloud in the current laser point cloud frame or the number of the laser point of the one historical obstacle laser point cloud in the historical obstacle laser point cloud sequence, and the second number of the laser point may represent another laser point count.

When calculating a similarity degree between a geometrical shape of one detected obstacle laser point cloud in the current laser point cloud frame and a geometrical shape of one historical obstacle laser point cloud in the historical obstacle laser point cloud sequence, the similarity degree between a laser point distribution characteristic of the one detected obstacle laser point cloud in the current laser point cloud frame and a laser point distribution characteristic of the one historical obstacle laser point cloud in the historical obstacle laser point cloud sequence may be used as a geometrical shape similarity degree. For the one obstacle laser point cloud, the space occupied by the bounding box of the obstacle laser point cloud may be divided into 3D grids of equal volume, statistics of the number of the laser point of the obstacle laser point cloud in each of the 3D grids is performed, and a distribution eigenvector whose number of dimensions is identical to the number of 3D grids is generated. The value of each dimension in the distribution eigenvector is a normalized value corresponding to the number of the laser point in the obstacle laser point cloud of the 3D grid corresponding to the dimension, and the distribution characteristic of the obstacle laser point cloud may be represented by the distribution eigenvector. A similarity degree between the distribution eigenvector representing the laser point distribution characteristic of the one detected obstacle laser point cloud in the current laser point cloud frame and a distribution eigenvector representing the laser point distribution characteristic of the one historical obstacle laser point cloud in the historical obstacle laser point cloud sequence may be calculated.

In some optional implementations of the embodiment, a current motion characteristic of the obstacle represented by the detected obstacle laser point cloud in the current laser point cloud frame may include, but is not limited to: an observed speed of the obstacle represented by the detected obstacle laser point cloud in the current laser point cloud frame at the moment of collecting the current laser point cloud frame, and an observed posture of the obstacle represented by the detected obstacle laser point cloud in the current laser point cloud frame at the moment of collecting the current laser point cloud frame. The historical motion characteristic of the obstacle represented by the historical obstacle laser point cloud in the historical obstacle laser point cloud sequence may include, but is not limited to: a historical speed obtained through a motion estimation of the obstacle represented by the historical obstacle laser point cloud at the moment of collecting the historical laser point cloud frame to which the historical obstacle laser point cloud in the historical obstacle laser point cloud sequence belongs, and a historical posture of the obstacle represented by the historical obstacle laser point cloud at the moment of collecting the historical laser point cloud frame to which the historical obstacle laser point cloud in the historical obstacle laser point cloud sequence belongs. The filtering method used for the motion estimation may include, but is not limited to: Gaussian Filter, Kalman Filter, Extended Kalman Filter and Unscented Kalman Filter.

When calculating consistency between a current motion characteristic of an obstacle represented by one detected obstacle laser point cloud in the current laser point cloud frame at the moment of collecting the current laser point cloud frame and a historical motion characteristic of an obstacle represented by a historical obstacle laser point cloud at a moment of collecting a historical laser point cloud frame to which the historical obstacle laser point cloud in the historical obstacle laser point cloud sequence belongs, an observed speed of the obstacle represented by the one detected obstacle laser point cloud in the current laser point cloud frame at the moment of collecting the current laser point cloud frame may be first calculated. When calculating the observed speed, the observed speed may be obtained by dividing a distance between an interest point of the one detected obstacle laser point cloud in the current laser point cloud frame at the moment that the current laser point cloud frame is collected and an interest point of a first historical obstacle laser point cloud in the historical obstacle laser point cloud sequence by a length of a collection period of the lidar, i.e., a length of time of collecting a laser point cloud frame by the lidar in one revolution. The interest point may include, but is not limited to: a center point of the bounding box, a gravity center point of the bounding box, an edge point of the bounding box and an angular point of the bounding box.

When calculating consistency between a current motion characteristic of an obstacle represented by one detected obstacle laser point cloud in the current laser point cloud frame and a historical motion characteristic of an obstacle represented by a historical obstacle laser point cloud in one historical obstacle laser point cloud sequence, a parameter capable of representing consistency between an observed speed of the obstacle represented by the one detected obstacle laser point cloud in the current laser point cloud frame and a historical speed obtained through a motion estimation of the obstacle represented by the historical obstacle laser point cloud in the one historical obstacle laser point cloud sequence and a parameter capable of representing consistency between an observed posture of the obstacle represented by the one detected obstacle laser point cloud in the current laser point cloud frame and a historical posture of the obstacle represented by the historical obstacle laser point cloud in the one historical obstacle laser point cloud sequence may be calculated respectively. Then, the parameter representing speed consistency and the parameter representing posture consistency may be weighted and calculated to obtain a parameter capable of representing consistency between the current motion characteristic of the obstacle represented by the one detected obstacle laser point cloud in the current laser point cloud frame and the historical motion characteristic of the obstacle represented by the historical obstacle laser point cloud in the one historical obstacle laser point cloud sequence.

When calculating a parameter representing consistency between an observed speed of an obstacle represented by one detected obstacle laser point cloud in the current laser point cloud frame at the moment of collecting the current laser point cloud frame and a historical speed obtained through a motion estimation of an obstacle represented by a historical obstacle laser point cloud in one historical obstacle laser point cloud sequence at a moment of collecting a historical laser point cloud frame to which the historical obstacle laser point cloud in the one historical obstacle laser point cloud sequence belongs, a modulus of a vector difference between a vector of the observed speed of the obstacle represented by the one detected obstacle laser point cloud in the current laser point cloud frame at the moment that the current laser point cloud frame is collected and a vector of the historical speed obtained through the motion estimation of the obstacle represented by the historical obstacle laser point cloud in the one historical obstacle laser point cloud sequence at the moment that the last laser point cloud frame prior to the current laser point cloud frame is collected, i.e., a historical laser point cloud frame to which a first historical obstacle laser point cloud in the one historical obstacle laser point cloud sequence belongs may be calculated, and the calculated modulus of the vector difference is used as the parameter representing consistency between the observed speed of the obstacle represented by the one detected obstacle laser point cloud in the current laser point cloud frame at the moment that the current laser point cloud frame is collected and the historical speed obtained through the motion estimation of the obstacle represented by the historical obstacle laser point cloud in the one historical obstacle laser point cloud sequence at the moment that the historical laser point cloud frame to which the historical obstacle laser point cloud in the historical obstacle laser point cloud sequence belongs is collected.

When calculating a parameter representing consistency between an observed speed of an obstacle represented by one detected obstacle laser point cloud in the current laser point cloud frame at the moment of collecting the current laser point cloud frame and a historical speed obtained through a motion estimation of an obstacle represented by a historical obstacle laser point cloud in one historical obstacle laser point cloud sequence at a moment of collecting the historical laser point cloud frame to which the historical obstacle laser point cloud in the one historical obstacle laser point cloud sequence belongs, moduli of vector differences between a vector of the observed speed of the obstacle represented by the one detected obstacle laser point cloud in the current laser point cloud frame at the moment of collecting the current laser point cloud frame and vectors of historical speeds obtained through a motion estimation of the obstacle represented by the historical obstacle laser point clouds in the one historical obstacle laser point cloud sequence at moments of collecting respective historical obstacle laser frames of multiple historical obstacle laser point clouds in the one historical obstacle laser point cloud sequence may be respectively calculated, and an average value of the moduli of the vector differences is used as the parameter representing consistency between the observed speed of the obstacle represented by the one detected obstacle laser point cloud in the current laser point cloud frame at the moment of collecting the current laser point cloud frame and the historical speed obtained through the motion estimation of the obstacle represented by the historical obstacle laser point cloud in the one historical obstacle laser point cloud sequence at the moment of collecting the historical laser point cloud frame to which the historical obstacle laser point cloud in the historical obstacle laser point cloud sequence belongs.

Step 203 includes: searching for a historical obstacle laser point cloud sequence to which the detected obstacle laser point cloud belongs.

In the embodiment, after obtaining multiple association degrees by calculating an association degree between each detected obstacle laser point cloud in the current laser point cloud frame and each historical obstacle laser point cloud sequence, a historical obstacle laser point cloud sequence to which the each detected obstacle laser point cloud in the current laser point cloud frame belongs may be searched for based on the association degrees obtained in the step 202.

For example, when an association degree between one detected obstacle laser point cloud in the current laser point cloud frame and one historical obstacle laser point cloud sequence is greater than an association degree threshold and the association degree between the one detected obstacle laser point cloud in the current laser point cloud frame and the one historical obstacle laser point cloud sequence is greater than association degrees between the one detected obstacle laser point cloud in the current laser point cloud frame and other historical obstacle laser point cloud sequences in the multiple historical obstacle laser point cloud sequences, the one historical obstacle laser point cloud sequence may be used as a candidate historical obstacle laser point cloud sequence of the one detected obstacle laser point cloud. When the one historical obstacle laser point cloud sequence is only used as the candidate historical obstacle laser point cloud of the one detected obstacle laser point cloud in the current laser point cloud frame, the one historical obstacle laser point cloud sequence may be used as the historical obstacle laser point cloud sequence to which the one detected obstacle laser point cloud in the current laser point cloud frame belongs, the one detected obstacle laser point cloud in the current laser point cloud frame may be added to the historical obstacle laser point cloud sequence to which the detected obstacle laser point cloud belongs as a historical obstacle laser point cloud, and the historical obstacle laser point cloud is not involved in matching any more. When the one historical obstacle laser point cloud sequence is used as a candidate historical obstacle laser point cloud of multiple, e.g., two detected obstacle laser point clouds in the current laser point cloud frame, the one historical obstacle laser point cloud sequence may be used as the historical obstacle laser point cloud sequence to which the detected obstacle laser point cloud whose association degree is higher belongs, and the one historical obstacle laser point cloud sequence is not involved in matching any more. For other unsuccessfully matched detected obstacle laser point clouds, a corresponding historical obstacle sequence whose association degree second highest and greater than an association degree threshold may be used as a new corresponding historical obstacle laser point cloud sequence having a highest association degree, and the searching process is repeated, by that analogy, until all searching processes are finished. When a detected obstacle laser point cloud fails to match any historical obstacle laser point cloud sequence, a historical obstacle laser point cloud sequence including the detected obstacle laser point cloud may be established for use in subsequent obstacle tracing process.

The detected obstacle laser point cloud in the current laser point cloud frame and the found historical obstacle laser point cloud sequence to which the detected obstacle laser point cloud belongs represent a same obstacle. Therefore, after finding out the historical obstacle laser point cloud sequence to which the detected obstacle laser point cloud belongs in the current laser point cloud frame, a location and a posture of the detected obstacle laser point cloud in the current laser point cloud frame may be used as a latest location and a latest posture of the same obstacle represented by the detected obstacle laser point cloud, the location of the obstacle laser point cloud may be a location of a center point of a bounding box of the obstacle laser point cloud, and the posture of the obstacle laser point cloud may be a posture of the bounding box of the obstacle laser point cloud. Thus, the latest location and a latest speed of the represented same obstacle may be determined to achieve tracking the represented same obstacle in real time.

In some optional implementations of the embodiment, a bipartite graph may be first established when searching for a historical obstacle laser point cloud sequence to which each detected obstacle laser point cloud in the current laser point cloud frame belongs based on the multiple association degrees. In the bipartite graph, each detected obstacle laser point cloud in the current laser point cloud frame corresponds to one node and each of the multiple historical obstacle laser point cloud sequences corresponds to one node in the bipartite graph.

In the bipartite graph, if an association degree between one detected obstacle laser point cloud in the current laser point cloud frame and one historical obstacle laser point cloud sequence is greater than an association degree threshold, then a node representing the one detected obstacle laser point cloud in the current laser point cloud frame and a node representing the one historical obstacle laser point cloud sequence are connected by a line segment, and a weight of the line segment is the association degree between the one detected obstacle laser point cloud in the current laser point cloud frame and the one historical obstacle laser point cloud sequence.

It should be appreciated that the steps 201-203 may be executed at a time interval of a collection period of the lidar, i.e., a time interval of a revolution of the lidar. That is, the steps 201-203 may be executed in response to collecting a latest laser point cloud frame. Acquired multiple historical obstacle laser point cloud sequences may refer to all historical obstacle laser point cloud sequences formed by tracking an obstacle prior to collecting the current laser point cloud frame. Therefore, the number of the multiple historical obstacle laser point cloud sequences acquired during executing the step 201 may be different from the number of the multiple historical obstacle laser point cloud sequences acquired during executing the step 201 last time.

For example, after executing the steps 201-203, when scanning a new obstacle, a new historical obstacle laser point cloud sequence may be established, and if it is determined that a period of an obstacle represented by a historical obstacle laser point cloud in a historical obstacle laser point cloud sequence being located outside a scanning range of the lidar reaches a time threshold, the historical obstacle laser point cloud sequence may be deleted.

After establishing the bipartite graph, the bipartite graph may be divided into multiple sub-bipartite graphs using a graph traversal method. Then, solutions of the sub-bipartitie graphs may be successively acquired. When a solution of a sub-bipartite graph is acquired, an appropriate operation may be executed based on a node characteristic of the sub-bipartite graph.

When a sub-bipartite graph includes a node representing the detected obstacle laser point cloud in the current laser point cloud frame and does not include a node representing the historical obstacle laser point cloud sequence, a historical obstacle laser point cloud sequence including the detected obstacle laser point cloud in the current laser point cloud frame may be established, the detected obstacle laser point cloud in the current laser point cloud frame may be added to the established historical obstacle laser point cloud sequence as a historical obstacle laser point cloud, i.e., a first historical obstacle laser point cloud in the historical obstacle laser point cloud sequence.

For example, when an obstacle represented by the detected obstacle laser point cloud in the current laser point cloud frame is an emerging obstacle, a historical obstacle laser point cloud sequence in which the detected obstacle laser point cloud in the current laser point cloud frame is a first historical obstacle laser point cloud may be established, and the established historical obstacle laser point cloud sequence may be used for tracking the emerging obstacle when a next laser point cloud frame after the current laser point cloud frame is collected.

When the sub-bipartite graph includes the node representing the historical obstacle laser point cloud sequence and does not include the node representing the detected obstacle laser point cloud in the current laser point cloud frame, for example, when an obstacle represented by the historical obstacle laser point cloud sequence is not located in a scanning range of the lidar, the historical obstacle laser point cloud sequence may be marked as unmatching any detected obstacle laser point cloud in the current laser point cloud frame in this matching process, and the number of unmatched times of the historical obstacle laser point cloud sequence may be updated, i.e., the number of unmatched times of the historical obstacle laser point cloud sequence may be increased by 1.

When the sub-bipartite graph includes the node representing the detected obstacle laser point cloud in the current laser point cloud frame, and the node representing the historical obstacle laser point cloud sequence, i.e., the detected obstacle laser point cloud in the current laser point cloud frame corresponding to each node representing the detected obstacle laser point cloud in the sub-bipartite graph is associated with at least one historical obstacle laser point cloud sequence, a maximum match of the sub-bipartite graph may be calculated using a Hungarian algorithm to obtain a matching result. Each matching result includes: a detected obstacle laser point cloud in the current laser point cloud frame and a historical obstacle laser point cloud sequence to which the detected obstacle laser point cloud belongs. The detected obstacle laser point cloud in the current laser point cloud frame in the matching result may be added to a historical obstacle laser point cloud sequence of the matching result as a first historical obstacle laser point cloud in the historical obstacle laser point cloud sequence.

For the detected obstacle laser point cloud in the current laser point cloud frame in the matching result, a speed may be obtained through a motion estimation of the detected obstacle laser point cloud in the current laser point cloud frame using a preset filtering algorithm. The preset filtering algorithm may include, but is not limited to: Gaussian Filter, Kalman Filter, Extended Kalman Filter and Unscented Kalman Filter.

The detected obstacle laser point cloud in the current laser point cloud frame becomes the first historical obstacle laser point cloud in the historical obstacle laser point cloud sequence to which the detected obstacle laser point cloud belongs. Therefore, the speed obtained through the motion estimation can be used for tracking the obstacle when a next laser point cloud frame after the current laser point cloud frame is collected.

After calculating the maximum match of the sub-bipartite graph, for a historical obstacle laser point cloud sequence without a corresponding matching result, i.e., a historical obstacle laser point cloud sequence without an established subordination relationship with any detected obstacle laser point cloud in the current laser point cloud frame, the number of unmatched times of the historical obstacle laser point cloud sequence without the corresponding matching result may be updated, i.e., the number of unmatched times is increased by 1, and the historical obstacle laser point cloud sequence may be marked as unmatching any detected obstacle laser point cloud in the current laser point cloud frame in this matching process.

After successively acquiring solutions of all sub-bipartite graphs in the bipartite graph, one tracking of the obstacle may be completed.

By converting the process of searching for the historical obstacle laser point cloud sequence to which each detected obstacle laser point cloud in the current laser point cloud frame belongs into the process of acquiring a solution of each sub-bipartite graph, and only nodes having certain association degrees are involved in calculation in the process of acquiring the solution of each sub-bipartite graph, thereby greatly reducing the calculation of the whole searching process, i.e., greatly reducing the calculation of the tracking process.

In some optional implementations of the embodiment, after successively acquiring solutions of all sub-bipartite graphs in the bipartite graph, whether the multiple historical obstacle laser point cloud sequences include a historical obstacle laser point cloud sequence meeting at least one preset condition may be further determined. The preset condition includes: a number of unmatched times within a preset time period being greater than a number threshold, a ratio of the number of unmatched times to a sum of a number of matching times and the number of unmatched times within the preset time period being greater than a ratio threshold, a number of consecutively unmatched times within the preset time period being greater than the number threshold, and a ratio of the number of consecutively unmatched times to the number of unmatched times within the preset time period being greater than the ratio threshold. When the multiple historical obstacle laser point cloud sequences include the historical obstacle laser point cloud sequence meeting the preset condition, the historical obstacle laser point cloud sequence meeting the preset condition may be deleted.

When the historical obstacle laser point cloud sequence meets the at least one preset condition, an obstacle represented by a historical obstacle laser point cloud in the historical obstacle laser point cloud sequence is likely to be located outside the scanning range of the lidar, and the historical obstacle laser point cloud sequence may be deleted. In subsequent tracking, the historical obstacle laser point cloud sequence is not involved in matching any more.

Figure 3:
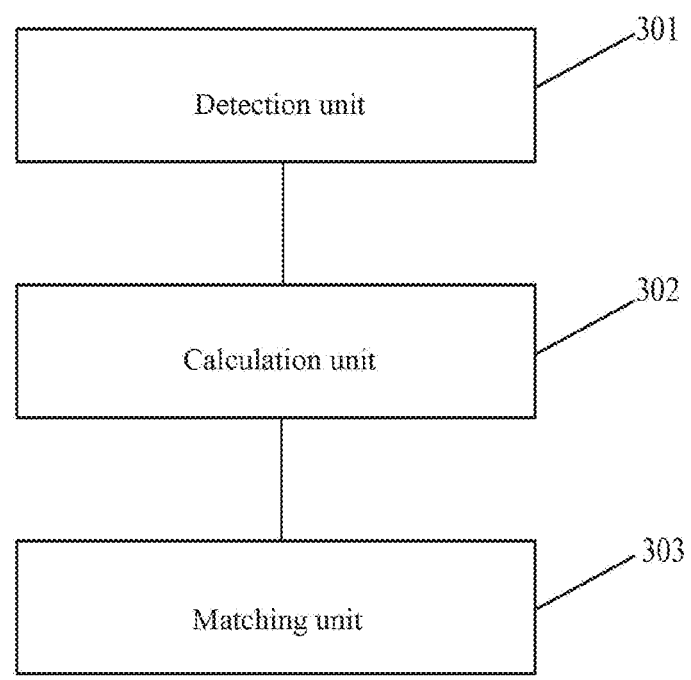
FIG. 3 shows a schematic diagram of a structure of an embodiment of an apparatus according to the disclosure.

Further referring to FIG. 3, as implementations of the methods shown in the above figures, the disclosure provides an embodiment of an apparatus for tracking an obstacle. The embodiment corresponds to the embodiment of the method shown in FIG. 2.

As shown in FIG. 3, the apparatus for tracking an obstacle includes: a detection unit 301, a calculation unit 302, and a matching unit 303. The detection unit 301 is configured for acquiring, in response to detecting multiple obstacle laser point clouds in a current laser point cloud frame, multiple historical obstacle laser point cloud sequences, each historical obstacle laser point cloud in a same historical obstacle laser point cloud sequence representing a same obstacle, each historical obstacle laser point cloud in the historical obstacle laser point cloud sequences being an obstacle laser point cloud in a historical laser point cloud frame collected prior to collecting the current laser point cloud frame; the calculation unit 302 is configured for calculating a respective association degree between each detected obstacle laser point cloud in the current laser point cloud frame and each historical obstacle laser point cloud sequence based on association information to obtain multiple association degrees, the association information including: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence; and the matching unit 303 is configured for searching for a historical obstacle laser point cloud sequence to which each detected obstacle laser point cloud in the current laser point cloud frame belongs based on the multiple association degrees.

In some optional implementations of the embodiment, the appearance characteristic includes: a size, a number of the laser point, a laser point density and a geometrical shape.

In some optional implementations of the embodiment, the current motion characteristic of the obstacle represented by the detected obstacle laser point cloud in the current laser point cloud frame includes: an observed speed of the obstacle represented by the detected obstacle laser point cloud at a moment of collecting the current laser point cloud frame, and an observed posture of the obstacle represented by the detected obstacle laser point cloud at the moment of collecting the current laser point cloud frame, and the historical motion characteristic of the obstacle represented by the historical obstacle laser point cloud in the historical obstacle laser point cloud sequence includes: a historical speed obtained through a motion estimation of the obstacle represented by the historical obstacle laser point cloud at a moment of collecting the historical laser point cloud frame to which the historical obstacle laser point cloud in the historical obstacle laser point cloud sequence belongs, and a historical posture of the obstacle represented by the historical obstacle laser point cloud at the moment of collecting the historical laser point cloud frame to which the historical obstacle laser point cloud in the historical obstacle laser point cloud sequence belongs.

In some optional implementations of the embodiment, the matching unit includes: a bipartite graph matching subunit, configured for establishing a bipartite graph, where each detected obstacle laser point cloud in the current laser point cloud frame corresponds to one node and each historical obstacle laser point cloud sequence in the multiple historical obstacle laser point cloud sequences correspond to one node in the bipartite graph, and for a pair of the detected obstacle laser point cloud in the current laser point cloud frame and the historical obstacle laser point cloud sequence whose association degree greater than an association degree threshold, a weight of a line segment between a node corresponding to the detected obstacle laser point cloud in the current laser point cloud frame and a node corresponding to the historical obstacle laser point cloud sequence in the bipartite graph is the association degree; and searching for the historical obstacle laser point cloud sequence to which the each detected obstacle laser point cloud in the current laser point cloud frame belongs based on the bipartite graph.

In some optional implementations of the embodiment, the bipartite graph matching subunit is further configured for: dividing the bipartite graph into multiple sub-bipartite graphs using a graph traversal method; acquiring a solution for each of the sub-bipartite graphs by: establishing a historical obstacle laser point cloud sequence including the detected obstacle laser point cloud in the current laser point cloud frame when the each sub-bipartite graph includes a node representing the detected obstacle laser point cloud in the current laser point cloud frame and does not include a node representing the historical obstacle laser point cloud sequence; updating a number of unmatched times of the historical obstacle laser point cloud sequence when the each sub-bipartite graph includes the node representing the historical obstacle laser point cloud sequence and does not include the node representing the detected obstacle laser point cloud in the current laser point cloud frame; and calculating a maximum match of the each sub-bipartite graph using a Hungarian algorithm to obtain a matching result when each sub-bipartite graph includes the node representing the detected obstacle laser point cloud in the current laser point cloud frame, and includes the node representing the historical obstacle laser point cloud sequence; adding the detected obstacle laser point cloud in the current laser point cloud frame in the matching result to the historical obstacle laser point cloud sequence in the matching result, obtaining a speed of the obstacle represented by the detected obstacle laser point cloud through using a preset filtering algorithm to perform a motion estimation of the obstacle represented by the detected obstacle laser point cloud in the current laser point cloud frame in the matching result, and updating a number of unmatched times of the historical obstacle laser point cloud sequence non-corresponding to the matching result.

In some optional implementations of the embodiment, the apparatus for tracking an obstacle further includes: a determining unit, configured for determining whether multiple historical obstacle laser point cloud sequences comprises a historical obstacle laser point cloud sequence meeting at least one preset condition, the preset condition including: a number of unmatched times within a preset time length being greater than a number threshold, a ratio of the number of unmatched times to a sum of a number of matching times and the number of unmatched times within the preset time length being greater than a ratio threshold, a number of consecutively unmatched times within the preset time length being greater than the number threshold, and a ratio of a number of consecutively unmatched times to the number of unmatched times within the preset time length being greater than the ratio threshold; and deleting the historical obstacle laser point cloud sequence meeting the at least one preset condition, when the multiple historical obstacle laser point cloud sequences comprises the historical obstacle laser point cloud sequence meeting at least one preset condition.

The disclosure further provides an autonomous vehicle, which may be equipped with one or more processors; and a memory for storing one or more programs, where the one or more programs may include instructions for executing the operations according to the steps 201-203. The one or more programs, when executed by the one or more processors, cause the one or more processors to execute the operations according to the steps 201-203.

The disclosure further provides a computer-readable medium. The computer-readable medium may be the computer-readable medium included in the autonomous vehicle or a stand-alone computer-readable medium not assembled into the autonomous vehicle. The computer-readable medium stores one or more programs, and the one or more programs, when executed by the autonomous vehicle, cause the autonomous vehicle to: acquire, in response to detecting multiple obstacle laser point clouds in a current laser point cloud frame, multiple historical obstacle laser point cloud sequences, each historical obstacle laser point cloud in a same historical obstacle laser point cloud sequence representing a same obstacle, each historical obstacle laser point cloud in the historical obstacle laser point cloud sequence being an obstacle laser point cloud in a historical laser point cloud frame collected prior to collecting the current laser point cloud frame; calculate a respective association degree between each detected obstacle laser point cloud in the current laser point cloud frame and each historical obstacle laser point cloud sequence based on association information to obtain multiple association degrees, the association information including: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence; and search for a historical obstacle laser point cloud sequence to which each detected obstacle laser point cloud in the current laser point cloud frame belongs based on the multiple association degrees.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instruction.

The units involved in the embodiments of the present disclosure may be implemented by means of software or hardware. The described units may also be provided in a processor, for example, described as: a processor, comprising a detection unit, a calculation unit and a matching unit, where the names of these units do not in some cases constitute a limitation to such units themselves. For example, the detection unit may also be described as "a unit for acquiring, in response to detecting multiple obstacle laser point clouds in a current laser point cloud frame, multiple historical obstacle laser point cloud sequences."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are example.

What is claimed is:

1. A method for tracking an obstacle, comprising:
acquiring, in response to detecting a plurality of obstacle laser point clouds in a current laser point cloud frame, a plurality of historical obstacle laser point cloud sequences, each historical obstacle laser point cloud in a same historical obstacle laser point cloud sequence representing a same obstacle, each historical obstacle laser point cloud in the historical obstacle laser point cloud sequences being an obstacle laser point cloud in a historical laser point cloud frame collected prior to collecting the current laser point cloud frame;
calculating a respective association degree between each detected obstacle laser point cloud in the current laser point cloud frame and each historical obstacle laser point cloud sequence based on association information to obtain a plurality of association degrees, the association information comprising: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence, wherein a number of the plurality of association degrees is a product of a number of detected obstacle laser point clouds in the current laser point cloud frame and a number of the plurality of historical obstacle laser point cloud sequences;
establishing a bipartite graph, wherein the each detected obstacle laser point cloud in the current laser point cloud frame and the each historical obstacle laser point cloud sequence in the plurality of historical obstacle laser point cloud sequences correspond to respective nodes in the bipartite graph, and for a pair of the detected obstacle laser point cloud in the current laser point cloud frame and the historical obstacle laser point cloud sequence having an association degree greater than an association degree threshold, a weight of a line segment between a node corresponding to the detected obstacle laser point cloud in the current laser point cloud frame and a node corresponding to the historical obstacle laser point cloud sequence in the bipartite graph is the association degree between the detected obstacle laser point cloud in the current laser point cloud frame and the historical obstacle laser point cloud sequence; and
searching for the historical obstacle laser point cloud sequence to which each detected obstacle laser point cloud in the current laser point cloud frame belongs based on the bipartite graph.

2. The method according to claim 1, wherein the appearance characteristic comprises: a size, a number of a laser point, a laser point density, and a geometrical shape.

3. The method according to claim 2, wherein the current motion characteristic of the obstacle represented by the detected obstacle laser point cloud in the current laser point cloud frame comprises: an observed speed of the obstacle represented by the obstacle laser point cloud detected at a moment of collecting the current laser point cloud frame, and an observed posture of the obstacle represented by the obstacle laser point cloud detected at the moment of collecting the current laser point cloud frame, and the historical motion characteristic of the obstacle represented by the historical obstacle laser point cloud in the historical obstacle laser point cloud sequence comprises: a historical speed obtained through a motion estimation of the obstacle represented by the historical obstacle laser point cloud at a moment of collecting the historical laser point cloud frame to which the historical obstacle laser point cloud in the historical obstacle laser point cloud sequence belongs, and a historical posture of the obstacle represented by the historical obstacle laser point cloud at the moment of collecting the historical laser point cloud frame to which the historical obstacle laser point cloud in the historical obstacle laser point cloud sequence belongs.

4. The method according to claim 1, wherein the searching for the historical obstacle laser point cloud sequence to which each detected obstacle laser point cloud in the current laser point cloud frame belongs based on the bipartite graph comprises:
dividing the bipartite graph into a plurality of sub-bipartite graphs using a graph traversal method; and
acquiring a solution for each of the sub-bipartite graphs by:
establishing a historical obstacle laser point cloud sequence comprising the detected obstacle laser point cloud in the current laser point cloud frame when the each sub-bipartite graph comprises a node representing the detected obstacle laser point cloud in the current laser point cloud frame and does not comprise a node representing the historical obstacle laser point cloud sequence,
updating a number of unmatched times of the historical obstacle laser point cloud sequence when the each sub-bipartite graph comprises the node representing the historical obstacle laser point cloud sequence and does not comprise the node representing the detected obstacle laser point cloud in the current laser point cloud frame, and
calculating a maximum match of the each sub-bipartite graph using a Hungarian algorithm to obtain a matching result when the each sub-bipartite graph comprises the node representing the detected obstacle laser point cloud in the current laser point cloud frame, and the node representing the historical obstacle laser point cloud sequence, adding the detected obstacle laser point cloud in the current laser point cloud frame in the matching result to the historical obstacle laser point cloud sequence in the matching result, obtaining a speed of the obstacle represented by the detected obstacle laser point cloud through using a preset filtering algorithm to perform a motion estimation of the obstacle represented by the detected obstacle laser point cloud in the current laser point cloud frame in the matching result, and updating a number of unmatched times of the historical obstacle laser point cloud sequence non-corresponding to the matching result.

5. The method according to claim 4, further comprising:
determining whether the plurality of historical obstacle laser point cloud sequences comprises a historical obstacle laser point cloud sequence meeting at least one preset condition, the preset condition comprising: a number of unmatched times within a preset time length being greater than a number threshold, a ratio of the number of unmatched times to a sum of a number of matching times and the number of unmatched times within the preset time length being greater than a ratio threshold, a number of consecutively unmatched times within the preset time length being greater than the number threshold, and a ratio of the number of consecutively unmatched times to the number of unmatched times within the preset time length being greater than the ratio threshold; and deleting the historical obstacle laser point cloud sequence meeting the at least one preset condition, when the plurality of historical obstacle laser point cloud sequences comprises the historical obstacle laser point cloud sequence meeting at least one preset condition.

6. An apparatus for tracking an obstacle, comprising:
at least one processor; and
a memory storing instructions, the instructions when executed by the at least one processor, cause the at least one processor to perform operations, the operations comprising:

acquiring, in response to detecting a plurality of obstacle laser point clouds in a current laser point cloud frame, a plurality of historical obstacle laser point cloud sequences, each historical obstacle laser point cloud in a same historical obstacle laser point cloud sequence representing a same obstacle, the each historical obstacle laser point cloud in the historical obstacle laser point cloud sequence being an obstacle laser point cloud in a historical laser point cloud frame collected prior to collecting the current laser point cloud frame;

calculating a respective association degree between each detected obstacle laser point cloud in the current laser point cloud frame and each historical obstacle laser point cloud sequence based on association information to obtain a plurality of association degrees, the association information comprising: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence, wherein a number of the plurality of association degrees is a product of a number of detected obstacle laser point clouds in the current laser point cloud frame and a number of the plurality of historical obstacle laser point cloud sequences;

establishing a bipartite graph, wherein the each detected obstacle laser point cloud in the current laser point cloud frame and the each historical obstacle laser point cloud sequence in the plurality of historical obstacle laser point cloud sequences correspond to respective nodes in the bipartite graph, and for a pair of the detected obstacle laser point cloud in the current laser point cloud frame and the historical obstacle laser point cloud sequence having an association degree greater than an association degree threshold, a weight of a line segment between a node corresponding to the detected obstacle laser point cloud in the current laser point cloud frame and a node corresponding to the historical obstacle laser point cloud sequence in the bipartite graph is the association degree between the detected obstacle laser point cloud in the current laser point cloud frame and the historical obstacle laser point cloud sequence; and searching for the historical obstacle laser point cloud sequence to which each detected obstacle laser point cloud in the current laser point cloud frame belongs based on the bipartite graph.

7. The apparatus according to claim 6, wherein the appearance characteristic comprises: a size, a number of a laser point, a laser point density, and a geometrical shape.

8. The apparatus according to claim 7, wherein the current motion characteristic of the obstacle represented by the detected obstacle laser point cloud in the current laser point cloud frame comprises: an observed speed of the obstacle represented by the detected obstacle laser point cloud at a moment of collecting the current laser point cloud frame, and an observed posture of the obstacle represented by the detected obstacle laser point cloud at the moment of collecting the current laser point cloud frame, and the historical motion characteristic of the obstacle represented by the historical obstacle laser point cloud in the historical obstacle laser point cloud sequence comprises: a historical speed obtained through a motion estimation of the obstacle represented by the historical obstacle laser point cloud at a moment of collecting the historical laser point cloud frame to which the historical obstacle laser point cloud in the historical obstacle laser point cloud sequence belongs, and a historical posture of the obstacle represented by the historical obstacle laser point cloud at the moment of collecting the historical laser point cloud frame to which the historical obstacle laser point cloud in the historical obstacle laser point cloud sequence belongs.

9. The apparatus according to claim 6, wherein the searching for the historical obstacle laser point cloud sequence to which each detected obstacle laser point cloud in the current laser point cloud frame belongs based on the bipartite graph comprises:

dividing the bipartite graph into a plurality of sub-bipartite graphs using a graph traversal method; and acquiring a solution for each of the sub-bipartite graphs by:

establishing a historical obstacle laser point cloud sequence comprising the detected obstacle laser point cloud in the current laser point cloud frame when the each sub-bipartite graph comprises a node representing the detected obstacle laser point cloud in the current laser point cloud frame and does not comprise a node representing the historical obstacle laser point cloud sequence;

updating a number of unmatched times of the historical obstacle laser point cloud sequence when the each sub-bipartite graph comprises the node representing the historical obstacle laser point cloud sequence and does not comprise the node representing the detected obstacle laser point cloud in the current laser point cloud frame; and calculating a maximum match of the each sub-bipartite graph using a Hungarian algorithm to obtain a matching result when the each sub-bipartite graph comprises the node representing the detected obstacle laser point cloud in the current laser point cloud frame, and the node representing the historical obstacle laser point cloud sequence, adding the detected obstacle laser point cloud in the current laser point cloud frame in the matching result to the historical obstacle laser point cloud sequence in the matching result, obtaining a speed of the obstacle represented by the detected obstacle laser point cloud through using a preset filtering algorithm to perform a motion estimation of the obstacle represented by the detected obstacle laser point cloud in the current laser point cloud frame in the matching result, and updating a number of unmatched times of the historical obstacle laser point cloud sequence non-corresponding to corresponding matching result.

10. The apparatus according to claim 9, the operations further comprising:

determining whether the plurality of historical obstacle laser point cloud sequences comprises a historical obstacle laser point cloud sequence meeting at least one preset condition, the preset condition comprising: a number of unmatched times within a preset time length being greater than a number threshold, a ratio of the number of unmatched times to a sum of a number of matching times and the number of unmatched times within the preset time length being greater than a ratio threshold, a number of consecutively unmatched times within the preset time length being greater than the number threshold, and a ratio of the number of consecutively unmatched times to the number of unmatched times within the preset time length being greater than the ratio threshold; and deleting the historical obstacle laser point cloud sequence meeting the at least one preset condition, when the plurality of historical obstacle laser point cloud sequences comprises the historical obstacle laser point cloud sequence meeting at least one preset condition.

11. A non-transitory computer storage medium, storing a computer program, wherein the program, when executed by a processor, causes the processor to perform operations, the operations comprising:

acquiring, in response to detecting a plurality of obstacle laser point clouds in a current laser point cloud frame, a plurality of historical obstacle laser point cloud sequences, each historical obstacle laser point cloud in a same historical obstacle laser point cloud sequence representing a same obstacle, each historical obstacle laser point cloud in the historical obstacle laser point cloud sequences being an obstacle laser point cloud in a historical laser point cloud frame collected prior to collecting the current laser point cloud frame;

calculating a respective association degree between each detected obstacle laser point cloud in the current laser point cloud frame and each historical obstacle laser point cloud sequence based on association information to obtain a plurality of association degrees, the association information comprising: a similarity degree between an appearance characteristic of the detected obstacle laser point cloud in the current laser point cloud frame and an appearance characteristic of the historical obstacle laser point cloud in the historical obstacle laser point cloud sequence, and consistency between a current motion characteristic of an obstacle represented by the detected obstacle laser point cloud in the current laser point cloud frame and a historical motion characteristic of an obstacle represented by the historical obstacle laser point cloud in the historical obstacle laser point cloud sequence, wherein a number of the plurality of association degrees is a product of a number of detected obstacle laser point clouds in the current laser point cloud frame and a number of the plurality of historical obstacle laser point cloud sequences;

establishing a bipartite graph, wherein the each detected obstacle laser point cloud in the current laser point cloud frame and the each historical obstacle laser point cloud sequence in the plurality of historical obstacle laser point cloud sequences correspond to respective nodes in the bipartite graph, and for a pair of the detected obstacle laser point cloud in the current laser point cloud frame and the historical obstacle laser point cloud sequence having an association degree greater than an association degree threshold a weight of a line segment between a node corresponding to the detected obstacle laser point cloud in the current laser point cloud frame and a node corresponding to the historical obstacle laser point cloud sequence in the bipartite graph is the association degree between the detected obstacle laser point cloud in the current laser point cloud frame and the historical obstacle laser point cloud sequence; and searching for the historical obstacle laser point cloud sequence to which each detected obstacle laser point cloud in the current laser point cloud frame belongs based on the bipartite graph.

* * * * *